USO10652864B2

United States Patent
Liu et al.

(10) Patent No.: US 10,652,864 B2
(45) Date of Patent: May 12, 2020

(54) SEQUENCE SIGNAL SENDING METHOD AND TERMINAL

(71) Applicant: Huawei Technologies Co., Ltd., Shenzhen, Guangdong (CN)

(72) Inventors: Yalin Liu, Shenzhen (CN); Jun Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 16/132,271

(22) Filed: Sep. 14, 2018

(65) Prior Publication Data

US 2019/0045496 A1 Feb. 7, 2019

Related U.S. Application Data

(63) Continuation of application No. PCT/CN2016/108374, filed on Dec. 2, 2016.

(30) Foreign Application Priority Data

Mar. 15, 2016 (CN) .......................... 2016 1 0147542

(51) Int. Cl.
*H04W 72/04* (2009.01)
*H04L 5/00* (2006.01)
*H04L 12/801* (2013.01)

(52) U.S. Cl.
CPC ....... *H04W 72/0406* (2013.01); *H04L 5/0053* (2013.01); *H04L 5/0094* (2013.01); *H04L 47/34* (2013.01)

(58) Field of Classification Search
CPC ....... H04L 5/00; H04L 5/0053; H04L 5/0094; H04L 47/34; H04W 72/04; H04W 72/0406

See application file for complete search history.

(56) References Cited

U.S. PATENT DOCUMENTS 7,359,427 B2 * 4/2008 Kanterakis ............. H04B 1/707
370/335
10,070,464 B2 * 9/2018 Tang ..................... H04L 5/0092
(Continued)

FOREIGN PATENT DOCUMENTS

CN 101155421 A 4/2008
CN 101442359 A 5/2009
(Continued)

OTHER PUBLICATIONS

"Mobile Station-Base Station Compatibility Standard for Dual-Mode Wideband Spread Spectrum Cellular Systems", Telecommunications Industry Association (TIA)/Electronic Industry Association (EIA) Interim Standard 95-A, May 1995, TIA/EIA/IS-95-A. (Year: 1995).*
(Continued)

*Primary Examiner* — Afsar M Qureshi
(74) *Attorney, Agent, or Firm* — Fish & Richardson P.C.

(57) ABSTRACT

Embodiments of the present disclosure disclose a sequence signal sending method, to receive control information from a network-side device, to clarify a channel resource used by a terminal to send a sequence signal to the network-side device. The method in the embodiments of the present disclosure includes: receiving, by a terminal, control information sent by a network-side device, where the control information includes a sequence identifier and a channel resource indication, and the channel resource indication is used to indicate a channel resource available for the terminal; determining, by the terminal, a corresponding sequence signal based on the sequence identifier; and sending, by the terminal, the sequence signal by using the channel resource. Therefore, it is ensured that the terminal obtains stable and reliable communication quality and provides satisfactory
(Continued)

user experience, and a performance requirement of a future network is fully met.

18 Claims, 6 Drawing Sheets

(56) References Cited

U.S. PATENT DOCUMENTS

| | | |
|---|---|---|
| 2008/0139214 A1 | 6/2008 | Sun et al. |
| 2014/0073287 A1 | 3/2014 | Zhang et al. |
| 2014/0206342 A1 | 7/2014 | Zhou et al. |
| 2015/0195788 A1 | 7/2015 | Au et al. |
| 2016/0014723 A1* | 1/2016 | Lyu ................ H04W 72/02 370/329 |
| 2019/0029072 A1* | 1/2019 | Zhu ................ H04W 40/22 |

FOREIGN PATENT DOCUMENTS

| | | | |
|---|---|---|---|
| CN | 104348601 A | * | 2/2015 |
| CN | 104348601 A | | 2/2015 |
| EP | 2464163 A1 | | 6/2012 |
| EP | 2750434 A1 | | 7/2014 |
| JP | 2017510124 A | | 4/2017 |

OTHER PUBLICATIONS

"Analysis and evaluation on PRACH coverage improvement for Low-Cost MTC UEs", Huawei, HiSilicon, 3GPP TSG RAN WG1 Meeting #72bis, Apr. 15-19, 2013, 7 pages, R1-130887 (Year: 2013).*

Office Action issued in Japanese Application No. 2018-561299 dated Jul. 8, 2019, 11 pages (with English translation).

* cited by examiner

SEQUENCE SIGNAL SENDING METHOD AND TERMINAL

CROSS-REFERENCE TO RELATED APPLICATIONS

This application is a continuation of International Application No. PCT/CN2016/108374, filed on Dec. 2, 2016, which claims priority to Chinese Patent Application No. 201610147542.0, filed on Mar. 15, 2016. The disclosures of the aforementioned applications are hereby incorporated by reference in their entireties.

TECHNICAL FIELD

The present application relates to the communications field, and in particular, to a sequence signal sending method.

BACKGROUND

A future mobile communications system needs to support large mobile data traffic increases, massive device connections, and various new services and application scenarios, for example, enhanced mobile broadband, massive machine type communications, and ultra-reliable and low latency communications. Therefore, the mobile communications system needs to have better performance, for example, a larger system capacity, a lower latency, more robust mobility, more precise terminal positioning, higher network reliability, and better network availability. For example, an objective of IMT (International Mobile Telecommunications)-2020 is to conveniently implement intelligent interconnection between human beings and everything.

In a user equipment-centric network, wide area coverage may be implemented by using a hypercell. The hypercell includes one or more subzones, and each subzone is provided with a transmission point having a fixed location. Each hypercell corresponds to a logical entity, and the logical entity is responsible for managing and controlling transmission points of all subzones of the hypercell. A terminal in a subzone can receive, on a downlink, a signal sent by a transmission point of the subzone, and the terminal can also send a signal to the transmission point of the subzone on an uplink. Therefore, how the terminal obtains a channel resource for sending a signal needs to be considered.

SUMMARY

Embodiments of the present disclosure provide a sequence signal sending method and a device that are applied to a user equipment-centric network, to indicate a channel resource used by a network-side device to send a sequence signal, so that a terminal can stably and reliably transmit the sequence signal.

In view of this, a first aspect of the embodiments of the present disclosure provides a sequence signal sending method. The method includes the following steps:

A network-side device generates control information. The control information includes a channel resource indication and a sequence identifier. The channel resource indication is used to indicate a channel resource used by a terminal. The network-side device generates the control information based on a status of a network. The status of the network may include a quantity of terminals, a transmission time interval, network resource usage, and the like in the network.

The network-side device sends the control information to the terminal by using a broadcast channel or a random access response channel. The channel resource indication may include channel resource allocation information. That is, the terminal obtains the control information by using a particular communications channel, the channel resource indication includes the channel resource available for the terminal, and the channel resource is indicated to the terminal, so that the terminal may obtain the channel resource from the control information. Optionally, the control information may be carried in system information SIB or a broadcast message MIB. Optionally, the control information may be carried in a random access response message or a contention resolution message in a random access process.

The terminal determines a corresponding sequence signal based on the sequence identifier. The terminal determines the available sequence signal based on the obtained sequence identifier. Specifically, the sequence signal is included in a sequence set, each sequence set has a sequence signal corresponding to a sequence identifier, and the correspondence between the sequence signal and the sequence identifier is preset. Therefore, the terminal may obtain the required sequence signal by using the sequence identifier and the preset correspondence.

The terminal sends the sequence signal by using the channel resource. After obtaining a sequence number and a corresponding channel resource, the terminal sends, by using the channel resource, the sequence number to a subzone in which the terminal is located, and when receiving the sequence number, the network-side device may learn of the subzone in which the terminal is located.

In the method, the required channel resource is clearly indicated to the terminal, and the method for transferring the channel resource is further clarified. Therefore, it is ensured that the terminal obtains stable and reliable communication quality and provides satisfactory user experience.

With reference to the first aspect, in a first implementation of the first aspect, the method includes: obtaining, by the terminal, a transmission time interval; determining, by the terminal based on a preset correspondence, a sequence set corresponding to the transmission time interval, where the preset correspondence indicates that the sequence set corresponds to the transmission time interval, and the sequence set includes one or more sequence signals; and determining, by the terminal based on a preset binding relationship, the sequence signal corresponding to the sequence identifier in the sequence set, where the preset binding relationship indicates that the sequence identifier corresponds to the sequence signal.

In the method, the channel resource can be adaptively and dynamically adjusted and configured based on different transmission time intervals, thereby effectively ensuring transmission efficiency, and more reliably implementing a terminal positioning and tracking function or supporting another function. In some feasible embodiments, the transmission time interval is merely used as one of considerable service features. The method may further be applied to different scenarios in which a quantity of users, a service feature, a time sequence resource, and the like are considered.

Optionally, with reference to the first aspect or the first implementation of the first aspect, in a second implementation of the first aspect, the method includes the following step:

The network-side device sends channel resource change information to the terminal on a paging/unicast channel. The channel resource change information indicates an updated channel resource. Due to changes of the quantity of terminals, the transmission time interval, and another network status in the network, the network-side device generates the channel resource change information based on a corresponding status, and the channel resource change information may be used to instruct the terminal to receive the updated channel resource. The terminal sends the sequence signal to the network-side device by using the updated channel resource.

In the method, although the network is unstable, the required channel resource may be clearly indicated to the terminal when the terminal sends the sequence signal to the network-side device, the method for transferring the channel resource may further be clarified, and the network-side device may be enabled to stably control the terminal. Therefore, it is ensured that the terminal obtains stable and reliable communication quality and provides satisfactory user experience.

A second aspect of the embodiments of the present disclosure provides a terminal. The terminal includes:

a first receiving module, configured to receive control information sent by a network-side device, where the control information includes a sequence identifier and a channel resource indication, and the channel resource indication is used to indicate a channel resource available for the terminal; a determining module, configured to determine a corresponding sequence signal based on the sequence identifier received by the first receiving module; and a first sending module, configured to send, by using the channel resource received by the first receiving module, the sequence signal determined by the determining module.

In the method, the required channel resource is clearly indicated to the terminal, and the method for transferring the channel resource is further clarified. Therefore, it is ensured that the terminal obtains stable and reliable communication quality and provides satisfactory user experience.

A third aspect of the embodiments of the present disclosure provides a network-side device. The network-side device includes:

a generation module, configured to generate control information, where the control information includes a channel resource indication and a sequence identifier, and the channel resource indication is used to indicate a channel resource used by a terminal; a first sending module, configured to send the control information generated by the generation module to the terminal; and a first receiving module, configured to receive a sequence signal that is sent by the terminal by using the channel resource carried in the control information sent by the first sending module, where the sequence signal is determined by the terminal based on the sequence identifier.

In the method, the required channel resource is clearly indicated to the terminal, and the method for transferring the channel resource is further clarified. Therefore, it is ensured that the terminal obtains stable and reliable communication quality and provides satisfactory user experience.

A fourth aspect of the embodiments of the present disclosure provides a terminal. The terminal includes:

a transceiver, a memory, a processor, and a bus. The transceiver, the memory, and the processor are connected by using the bus. The transceiver is configured to receive control information sent by a network-side device, the control information includes a sequence identifier and a channel resource indication, and the channel resource indication is used to indicate a channel resource available for the terminal. The processor is configured to determine a corresponding sequence signal based on the sequence identifier. The transceiver is further configured to send the sequence signal by using the channel resource. The memory is configured to store a program, the sequence identifier, the sequence signal, the control information, and the channel resource indication.

According to a fifth aspect, an embodiment of the present disclosure provides a sequence signal receiving method. The method is applied to a user equipment-centric network and specifically includes:

generating, by a network-side device, control information, where the control information includes a channel resource indication and a sequence identifier, and the channel resource indication is used to indicate a channel resource used by a terminal; sending, by the network-side device, the control information to the terminal; and receiving, by the network-side device, a sequence signal that is sent by the terminal by using the channel resource, where the sequence signal is determined by the terminal based on the sequence identifier.

In an example of an embodiment, an embodiment of the present disclosure further provides a non-transitory computer readable storage medium. When an instruction in the storage medium is executed by a processor of a network device, the network device is caused to perform any of the foregoing sequence signal sending method or the sequence signal receiving method.

It should be understood that some technical features such as the sequence signal, the control information, and how to transmit the signal or the information in the second to the fifth aspect are similar or corresponding to some technical features in the first aspect, and details are not described herein again.

It can be learned from the foregoing technical solutions that the embodiments of the present disclosure have the following advantages:

The terminal receives the control information sent by the network-side device, where the control information includes the sequence identifier and the channel resource indication, obtains the sequence signal by using the sequence identifier and the preset correspondence, and obtains the channel resource by using the channel resource indication, so that when the terminal sends the sequence signal to the network-side device, the required channel resource is clearly indicated to the terminal, and the method for transferring the channel resource is further clarified. Therefore, it is ensured that the terminal obtains stable and reliable communication quality and provides satisfactory user experience.

DESCRIPTION OF EMBODIMENTS

An embodiment of the present disclosure provides a sequence signal sending method, to receive control information from a network-side device, to clarify a channel resource used by a terminal to send a sequence signal to the network-side device.

Figure 1:
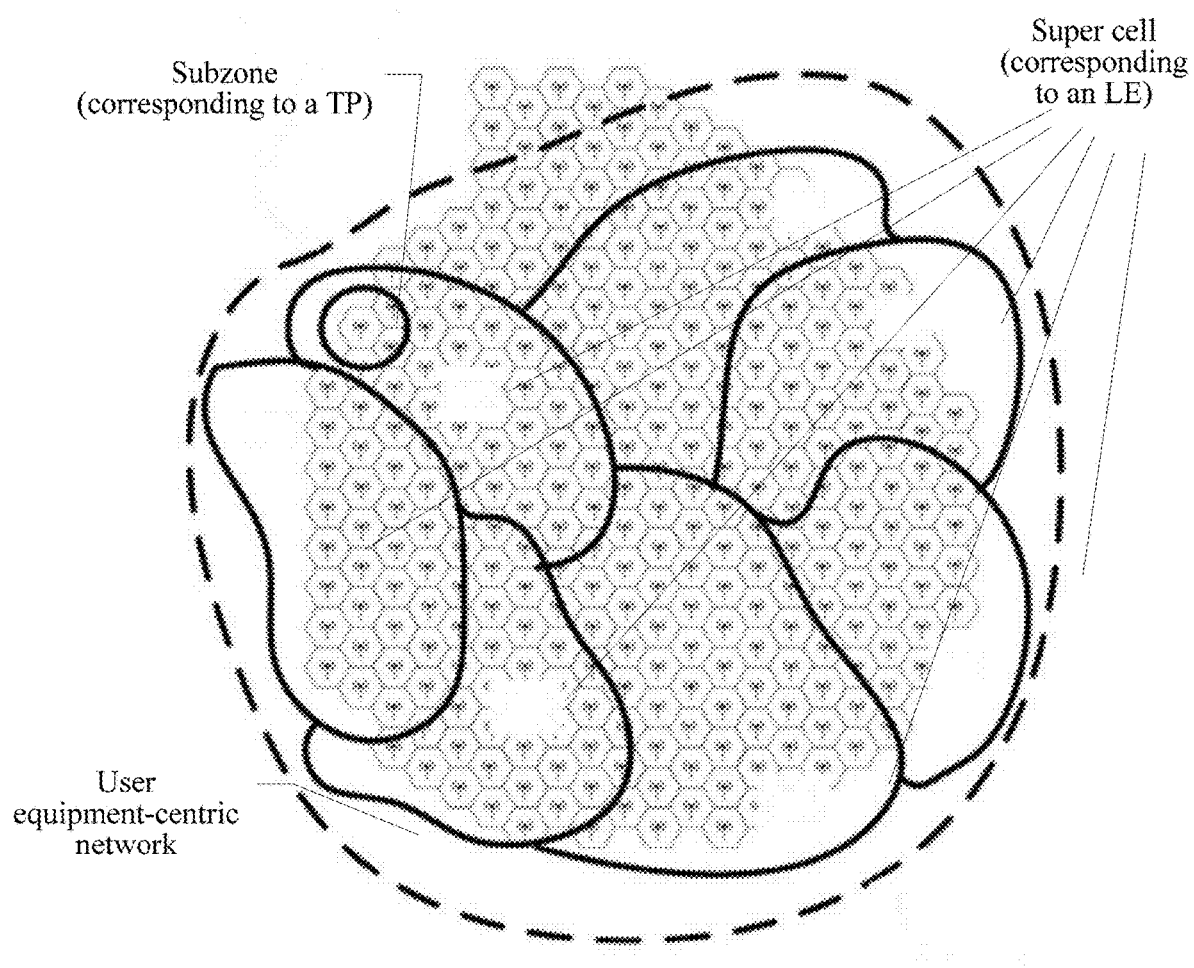
FIG. 1 is a schematic diagram of a framework of a user equipment-centric network according to an embodiment of this application.

As shown in FIG. 1, FIG. 1 is a schematic diagram of a framework of a user equipment-centric network. In the network, one or more subzones may form a hypercell in a particular time as required. At least one subzone supports radio wave access of one or more terminals. Each hypercell corresponds to a logical entity (LE). Each subzone corresponds to a transmission point (TP). The LE and all TPs in the hypercell are collectively referred to as a network-side device. The network-side device may allocate a sequence identifier to the terminal. The terminal may obtain a corresponding sequence signal by using the sequence identifier, and may send the sequence signal to the network-side device. At least one subzone in the hypercell provides radio wave access to a radio wave communications network.

In this embodiment of the present disclosure, a subzone may be fixed space. A corresponding transmission point TP may be a base station, that is, a public mobile communications base station which is a physical construction used for communication and may include a base transceiver station (BTS) and a base station controller (BSC). This is not limited in the present disclosure, and the base transceiver station and the base station controller are common knowledge, and details are not described herein. It should be noted that when entering an area of the subzone, the terminal may send the sequence signal or another signal to the TP corresponding to the subzone, so that the TP communicates with the terminal.

In this embodiment of the present disclosure, several subzones may form a hypercell in a particular time based on a status of the terminal in the network. A logical entity LE corresponding to the hypercell centrally manages all TPs in the hypercell. When the status of the network changes, the subzones forming the hypercell may be correspondingly adjusted, that is, the TPs managed by the LE are correspondingly adjusted. In some feasible embodiments, a hypercell and a corresponding LE may be determined based on a channel resource requirement of the terminal in the network. For example, in a time period, if terminals in an area A are very dense, the area A may be divided into a plurality of hypercells. In each hypercell, an LE is used to manage a TP of a subzone in the hypercell. If terminals in an area B are very sparse, only one hypercell may be used in the area B. Compared with an original network-side device-centric cellular network, in a terminal-centric network having a hypercell, a resource allocation policy is more flexibly stipulated based on a status of a terminal. It should be noted that the terminal includes a mobile phone, a tablet computer, a personal computer, a smartphone, an express tracking identifier, and the like. This is not limited herein.

In the hypercell, each subzone is allocated a sequence set, and the sequence set includes one or more sequence signals. In some feasible embodiments, different subzones may reuse a same sequence set or may use different sequence sets. This is not limited herein. It should be noted that in this embodiment of the present disclosure, to avoid signal interference between the subzones, two neighboring subzones use different sequence sets, and two non-neighboring subzones may use a same sequence set. Specifically, when the TP receives a sequence signal, because two neighboring subzones do not use a same sequence set, the TP may determine whether the sequence signal belongs to one of sequence sets configured for the TP. Therefore, whether the terminal is in the subzone may be determined. It should be noted that, each sequence set has only one sequence signal corresponding to a sequence identifier. In addition, the TP receives the sequence signal for both tracking and positioning and power controlling. This is not limited herein.

In some feasible embodiments, a positioning function of the terminal in the hypercell may be implemented with assistance from the terminal by sending a sequence signal on an uplink tracking channel. The terminal in the hypercell obtains a particular sequence identifier of the terminal, and then obtains a sequence signal from the sequence set based on the particular sequence identifier of the terminal and a preset correspondence, to determine a specific sequence signal of the terminal. The specific sequence signal is sent on the tracking channel to implement the positioning function of the terminal. Specifically, when the terminal sends, by using the channel resource, the sequence signal to a transmission point of the subzone in which the terminal is located, the transmission point sends information to a logical entity to indicate that the terminal is in an area in which the transmission point is located, so that the logical entity obtains a location of the terminal.

In the hypercell, a wireless transmission environment of the terminal changes at any time, and network system load also dynamically changes with time. In the method, in a tracking process, if the required channel resource is not effectively configured for the terminal in time, there is no clear transmission method for sending configuration information of the channel resource. Consequently, it is difficult to ensure that a user obtains stable and reliable communication quality and satisfactory service experience is provided for the user.

An embodiment of the present disclosure provides a way and a method for obtaining a channel resource by a terminal. The terminal receives control information sent by a network-side device, where the control information includes a sequence identifier and a channel resource indication, obtains a sequence signal by using the sequence identifier and a preset correspondence, and obtains a channel resource by using the channel resource indication, so that the terminal may send the sequence signal to the network-side device. For ease of understanding, a specific procedure in this embodiment of the present disclosure is described below. Specifically, referring to FIG. 2, a sequence signal sending embodiment according to embodiments of the present disclosure includes the following steps.

201. A network-side device generates control information.

In this embodiment of the present disclosure, the network-side device generates the control information based on a status of a network. The status of the network may include a quantity of terminals, a transmission time interval, and network resource usage in the network, and a scenario in which each terminal in the network is located, for example, a stationary terminal, a low-speed moving terminal, or a high-speed moving terminal.

In this embodiment of the present disclosure, the control information includes a channel resource indication and a sequence identifier. The channel resource indication is used to indicate a channel resource available for the terminal. In some feasible embodiments, the sequence identifier may be a C-RNTI, a U-RNTI, an IMEI (International Mobile Equipment Identity) of the terminal, or a generation parameter of a sequence signal in a sequence set. This is not limited herein. Obtaining the sequence identifier by the network-side device is common knowledge, and details are not described herein.

202. The network-side device sends the control information to a terminal by using a broadcast channel/random access response channel.

In some feasible embodiments, the channel resource indication may include channel resource allocation information, that is, the terminal obtains the control information by using a particular communications channel, the channel resource indication includes the channel resource available for the terminal, and the channel resource is indicated to the terminal, so that the terminal may obtain the channel resource from the control information. The channel resource herein may include a location, a size, a period, and the like of a channel. This is not limited herein.

In some other feasible embodiments, the channel resource indication may not carry the channel resource, and is used to instruct the terminal to obtain the channel resource from a particular channel. In some feasible embodiments, a network system predefines a plurality of different channel resources in a protocol. When receiving the control information, the terminal obtains the channel resource from the protocol based on the channel resource allocation information indicated by the channel resource indication. No limitation is imposed herein provided that the control information can instruct the terminal to obtain the channel resource.

Different communications channels are separately described below. In some feasible embodiments, the network-side device may send the control information to the terminal by using the broadcast channel, so that all terminals in a hypercell receive broadcast information including the control information, and obtain the channel resource from the broadcast information. The broadcast channel may include a BCCH, an FCCH, or an SCH. The BCCH, the FCCH, and the SCH are all unidirectional downlink channels, that is, from the network-side device to the terminal. The BCCH is mainly used to send a system message, the FCCH mainly corrects a frequency, and the SCH is a synchronous channel. On the channels, the control information is transferred in a point-to-multipoint manner. It should be noted that the control information may be included in a master information block (MIB) or a system information block (SIB). The MIB and the SIB are common knowledge, are details are not described herein.

In some other feasible embodiments, the network-side device may send the control information to the terminal by using the random access response channel, so that all the terminals in the hypercell receive the control information and obtain the channel resource from the control information.

Figure 3:
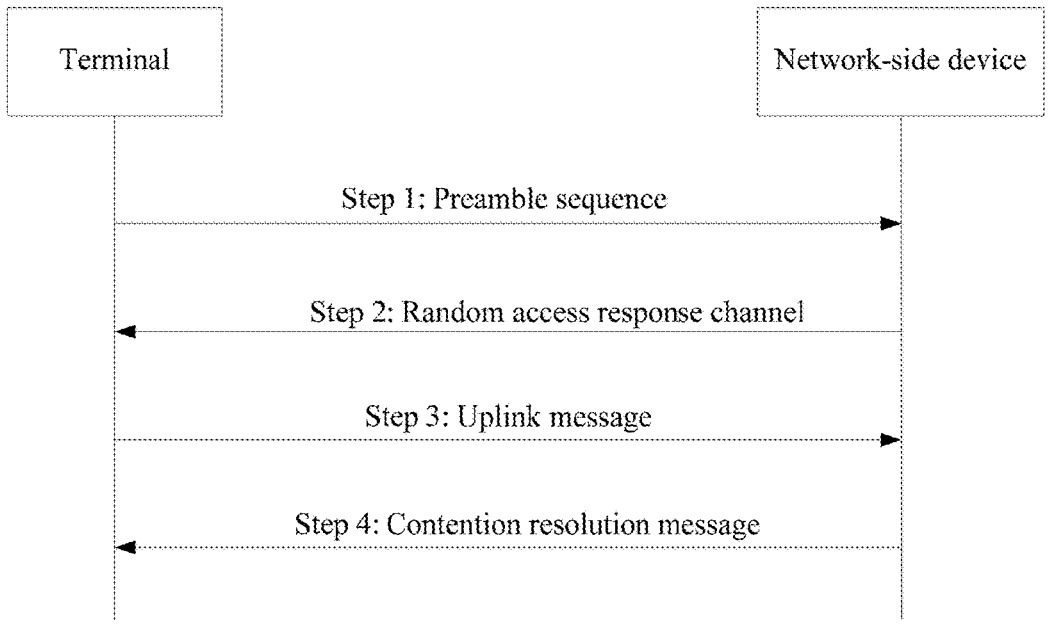
FIG. 3 is a schematic diagram of an embodiment of a random access process according to embodiments of the present disclosure.

Specifically, referring to FIG. 3, FIG. 3 shows a random access process:

Step 1. The terminal randomly selects a preamble sequence, and sends the preamble sequence to a base station on a random access channel (RACH). In some feasible embodiments, the random access process may be contention-based, and in the contention-based random access process, the terminal randomly selects a preamble sequence and sends the preamble sequence on the random access channel. In this embodiment of the present disclosure, in the random access process, a sequence identifier may be allocated to the terminal, and an uplink channel resource may further be allocated to the terminal. It should be noted that in some other feasible embodiments, the random access process is alternatively non-contention-based, and the network-side device allocates a preamble sequence to the terminal.

Step 2. The base station detects the preamble sequence and sends a random access response to the terminal, where the random access response may include control information, and the control information includes a channel resource indication and a sequence identifier.

Step 3. After receiving the random access response, the terminal sends an uplink message on the allocated channel resource based on an indication of the random access response. In this embodiment of the present disclosure, regardless of whether the random access process is a contention-based random access process, after detecting that the preamble sequence is sent, the network-side device sends a random access response in a downlink. In this embodiment of the present disclosure, the random access response is the control information. The control information may include the channel resource indication, and the sequence identifier of the preamble sequence.

Step 4. The base station receives the uplink message sent by the terminal, and returns a contention resolution message to the terminal that successfully accesses the base station. In some feasible embodiments, the control information may alternatively be included in the contention resolution message. This is not limited herein.

203. The terminal determines a corresponding sequence signal based on a sequence identifier.

In this embodiment of the present disclosure, after receiving the control information, the terminal obtains the sequence identifier first. In some feasible embodiments, the control information may further carry a MAC address or an IP address of the terminal, or another indication manner. This is not limited herein. The terminal determines an available sequence signal based on the obtained sequence identifier. Specifically, the sequence signal is included in a sequence set, and the sequence set may be determined based on the TTI. Different TTIs correspond to different sequence sets. Each sequence set has a sequence signal corresponding to a sequence identifier, and the correspondence between the sequence signal and the sequence identifier is preset. Therefore, the terminal may obtain the required sequence signal by using the sequence identifier and the preset correspondence.

In some feasible embodiments, a value of the TTI may be 0.5 ms, 1 ms, or 10 ms. When the value of the TTI is 0.5 ms, the following sequence set is correspondingly used, and a sequence signal in the sequence set is a Walsh code W4 having a length of four symbols.

| 0 | 0 | 0 | 0 |
| 0 | 1 | 0 | 1 |
| 0 | 0 | 1 | 1 |
| 0 | 1 | 1 | 0 |

When the value of the TTI is 1 ms, the following sequence set is correspondingly used, and a sequence signal in the sequence set is a Walsh code W8 having a length of eight symbols.

| | | | | | | | |
|---|---|---|---|---|---|---|---|
| 0 | 0 | 0 | 0 | 0 | 0 | 0 | 0 |
| 0 | 1 | 0 | 1 | 0 | 1 | 0 | 1 |
| 0 | 0 | 1 | 1 | 0 | 0 | 1 | 1 |
| 0 | 1 | 1 | 0 | 0 | 1 | 1 | 0 |
| 0 | 0 | 0 | 0 | 1 | 1 | 1 | 1 |
| 0 | 1 | 0 | 1 | 1 | 0 | 1 | 0 |
| 0 | 0 | 1 | 1 | 1 | 1 | 0 | 0 |
| 0 | 1 | 1 | 0 | 1 | 0 | 0 | 1 |

When the value of the TTI is 10 ms, a sequence set is correspondingly used, and a sequence signal in the sequence set is formed by 20 Walsh codes having the length of four symbols [W4, W4, . . . , W4], or formed by 10 Walsh codes having the length of eight symbols [W8, W8, . . . , W8].

Specifically, different TTIs correspond to different sequence sets. Therefore, the sequence set may be determined based on the TTI used by the terminal. Each sequence set has a sequence signal corresponding to a sequence identifier, and the correspondence between the sequence signal and the sequence identifier is preset. Therefore, the terminal may obtain the required sequence signal from the determined sequence set by using the sequence identifier and the preset correspondence.

It should be noted that the TTI is merely a parameter in the network and is one of factors affecting a sequence number. The factor may further include a factor such as a time sequence resource in addition to the TTI. In this embodiment, the TTI is merely used as an example for description.

204. The terminal sends the sequence signal by using a channel resource.

In some feasible embodiments, the sequence signal may be used by the network-side device to position and track the terminal. After obtaining a sequence number and a corresponding channel resource, the terminal sends, by using the channel resource, the sequence number to a subzone in which the terminal is located, and when receiving the sequence number, the network-side device may learn of the subzone in which the terminal is located. Specifically, the terminal sends, by using the channel resource, the sequence signal to a transmission point of the subzone in which the terminal is located, and then the transmission point sends information to a logical entity to indicate that the terminal is in an area in which the transmission point is located, so that the logical entity obtains a location of the terminal. When subzones in the network are denser, positioning precision of the method is higher.

In some other feasible embodiments, once the terminal communicates with the network-side device, the network-side device may control the terminal to send the sequence signal. Specifically, the network-side device may deliver an instruction on the downlink. The instruction may indicate a process in which the terminal sends the sequence signal on the channel resource. The process includes starting, pausing, continuation, reallocation, and sending termination. This is not limited herein. After receiving an indication, the terminal may execute the instruction.

In some other feasible embodiments, the terminal sends the sequence signal to the network-side device, so that the network-side device determines a value of a transmit power of the terminal based on a strength of the signal. Therefore, the network-side device sends information to the terminal to control the transmit power of the terminal.

The following step 205 to step 207 are used as optional steps in the present disclosure for description:

205. The network-side device generates channel resource change information.

In some feasible embodiments, due to changes of the quantity of terminals, the transmission time interval, and another network status in the network, the network-side device generates the channel resource change information based on a corresponding status. The channel resource change information may carry or indicate an updated channel resource, so that after obtaining the channel resource, the terminal may send the sequence signal by using the channel resource. In some other feasible embodiments, the channel resource change information does not carry the channel resource, and may be used to indicate a channel and a time used by the terminal to receive the channel resource allocation information. The channel may be a broadcast channel or may be a channel specially used for a particular terminal. This is not limited herein.

In some feasible embodiments, the network-side device may establish an independent data channel between the terminal and the network-side device. Each sent data packet may be transferred to only one terminal. The network-side device may select to use an IP unicast protocol. The network-side device selects a transmission path based on a destination address of the network-side device, and transfers the channel resource change information as IP unicast data to the terminal specified by the network-side device.

In some other feasible embodiments, the network-side device may send the channel resource change information to the terminal in a paging manner. It should be noted that paging may include paging initiated by a network side and paging initiated by a terminal side. The paging initiated by the network-side device is used to establish a signaling connection. The paging initiated by the network-side device may also be classified into collaborative paging and non-collaborative paging. No limitation is imposed herein provided that the network side can communicate with the terminal through paging.

It should be noted that the terminal corresponds to different sequence sets at different time points based on different network scenario environments and different network changes in different time periods, and the transmission time interval (TTI) is an important parameter representing different network scenario environments in a wireless communications system. In some feasible embodiments, each TTI corresponds to a sequence set, so that the terminal may determine the sequence set based on the TTI and the preset correspondence.

206. The terminal receives the channel resource change information.

In this embodiment of the present disclosure, after receiving the channel resource change information, the terminal may obtain the available updated channel resource from the channel resource change information. In some feasible embodiments, the channel resource change information may include the updated channel resource, and the terminal directly uses the channel resource after receiving the channel resource change information. In some other feasible embodiments, the channel resource change information does not include the channel resource allocation information, but instructs the terminal to obtain the channel resource allocation information on the broadcast channel or a unicast channel. This is not limited herein.

207. The terminal sends the sequence signal by using a channel resource.

In this embodiment, step 207 is the same as step 203, and details are not described herein again.

The terminal receives the control information sent by the network-side device, where the control information includes the sequence identifier and the channel resource indication, obtains the sequence signal by using the sequence identifier and the preset correspondence, and obtains the channel resource by using the channel resource indication, so that when the terminal sends the sequence signal to the network-side device, the required channel resource is clearly indicated to the terminal, and the method for transferring the channel resource is further clarified. Therefore, it is ensured that the terminal obtains stable and reliable communication quality and provides satisfactory user experience.

The sequence signal sending method in the embodiments of this application is described above, and the terminal in the embodiments of this application is described below.

Figure 4:
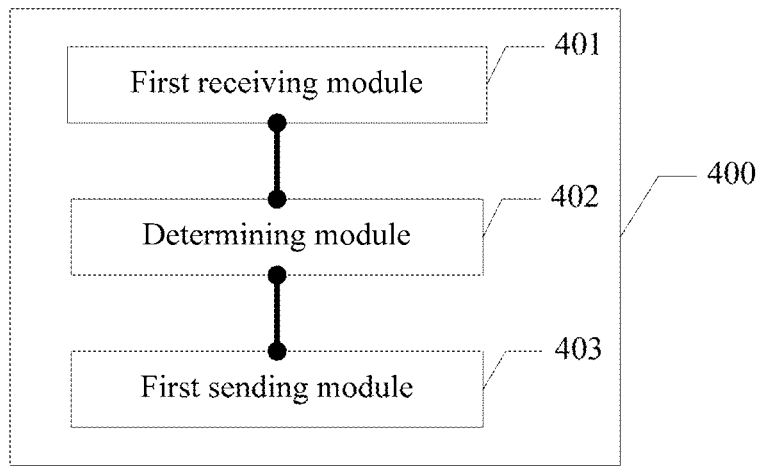
FIG. 4 is a schematic diagram of an embodiment of a terminal according to embodiments of the present disclosure.

Referring to FIG. 4, an embodiment of this application further provides a terminal 400. The terminal includes:

a first receiving module 401, configured to receive control information sent by a network-side device, where the control information includes a sequence identifier and a channel resource indication, and the channel resource indication is used to indicate a channel resource available for the terminal;

a determining module 402, configured to determine a corresponding sequence signal based on the sequence identifier received by the first receiving module 401; and a first sending module 403, configured to send, by using the channel resource received by the first receiving module 401, the sequence signal determined by the determining module 402.

Figure 5:
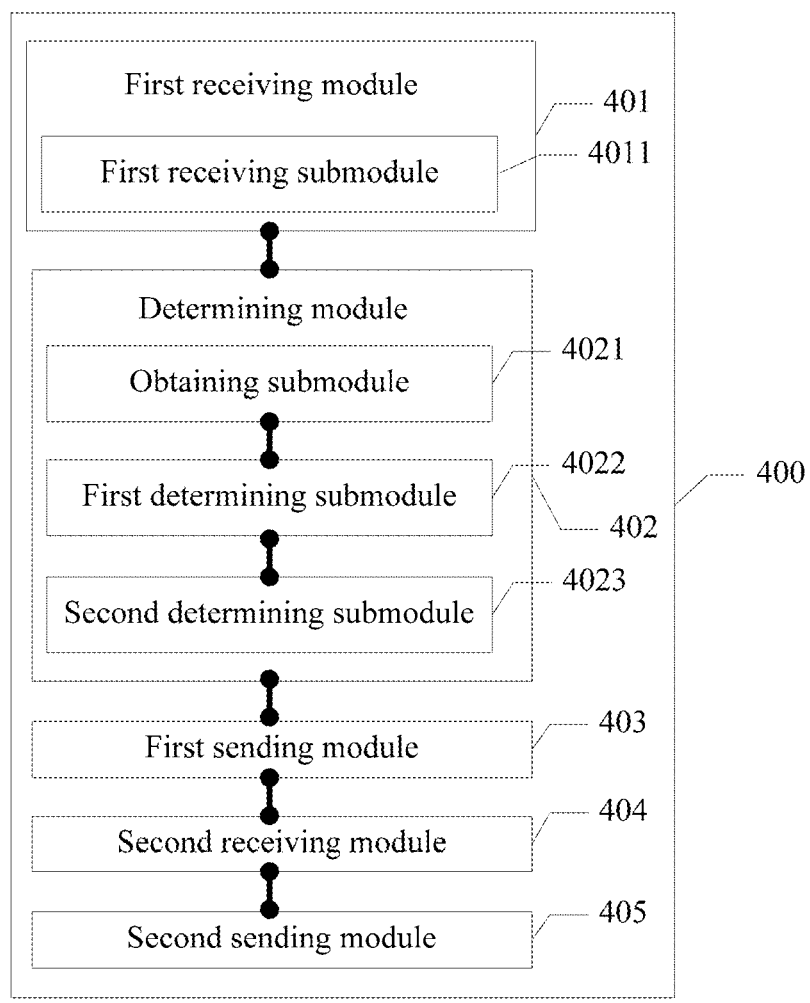
FIG. 5 is a schematic diagram of another embodiment of a terminal according to embodiments of the present disclosure.

Specifically, referring to FIG. 5, the determining module 402 includes:

an obtaining submodule 4021, configured to obtain a transmission time interval;

a first determining submodule 4022, configured to determine, based on a preset correspondence, a sequence set corresponding to the transmission time interval obtained by the obtaining submodule 4021, where the preset correspondence indicates that the sequence set corresponds to the transmission time interval, and the sequence set includes one or more sequence signals; and a second determining submodule 4023, configured to determine, based on a preset binding relationship, the sequence signal corresponding to the sequence identifier that is received by the first receiving module 401 and that is in the sequence set determined by the first determining submodule 4022, where the preset binding relationship indicates that the sequence identifier corresponds to the sequence signal.

The first receiving module 401 includes:

a first receiving submodule 4011, configured to receive, on a broadcast channel, the control information sent by the network-side device, where the control information is carried in system information block (SIB) or a broadcast message master information block (MIB).

The terminal 400 may further include:

a second receiving module 404, configured to receive channel resource change information, where the channel resource change information indicates an updated channel resource; and a second sending module 405, configured to send the sequence signal to the network-side device by using the updated channel resource received by the second receiving module 404.

Figure 6:
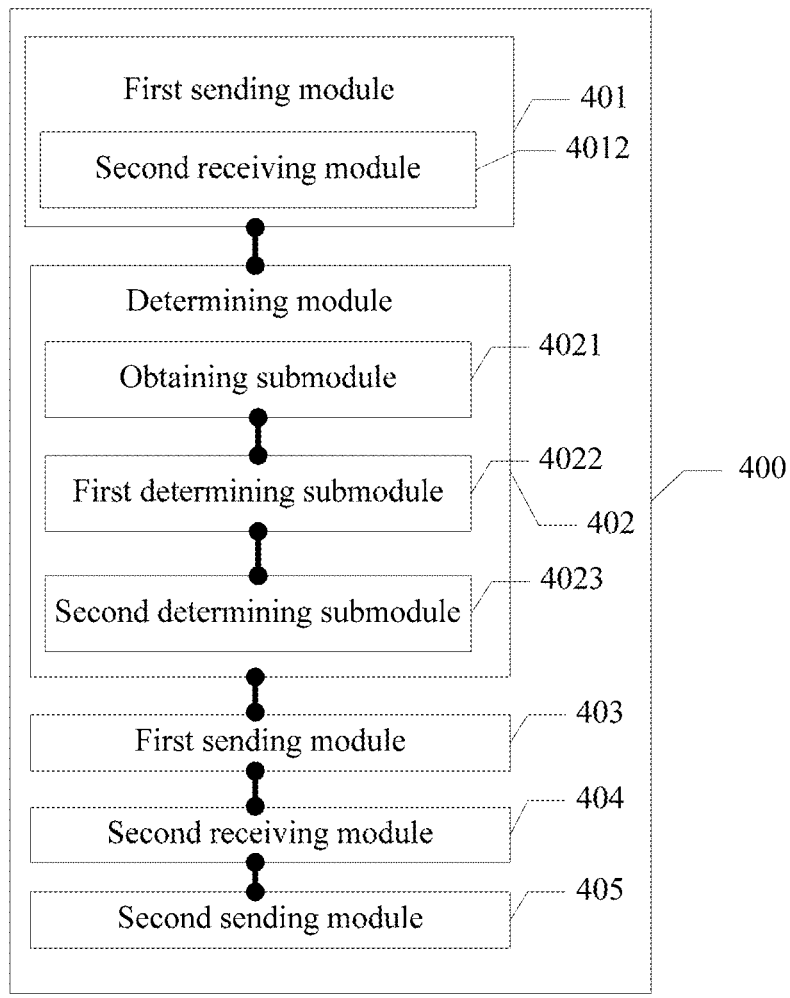
FIG. 6 is a schematic diagram of another embodiment of a terminal according to embodiments of the present disclosure.

Referring to FIG. 6, the first receiving module 401 includes:

a second receiving submodule 4012, configured to receive, on a random access response channel, the control information sent by the network-side device.

The terminal receives the control information sent by the network-side device, where the control information includes the sequence identifier and the channel resource indication, obtains the sequence signal by using the sequence identifier and the preset correspondence, and obtains the channel resource by using the channel resource indication, so that when the terminal sends the sequence signal to the network-side device, the required channel resource is clearly indicated to the terminal, and the method for transferring the channel resource is further clarified. Therefore, it is ensured that the terminal obtains stable and reliable communication quality and provides satisfactory user experience.

The terminal in the embodiments of this application is described above, and the network-side device in the embodiments of this application is described below.

Figure 7:
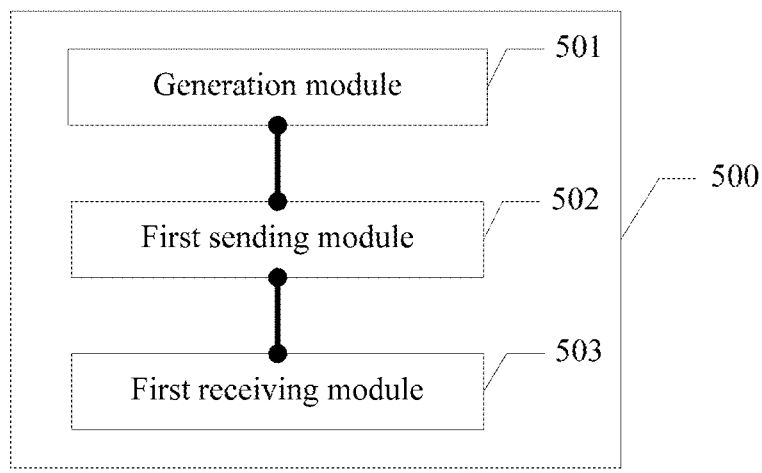
FIG. 7 is a schematic diagram of an embodiment of a network-side device according to embodiments of the present disclosure.

Referring to FIG. 7, an embodiment of this application further provides a network-side device 500. The network-side device includes:

a generation module 501, configured to generate control information, where the control information includes a channel resource indication and a sequence identifier, and the channel resource indication is used to indicate a channel resource used by a terminal 400;

a first sending module 502, configured to send the control information generated by the generation module 501 to the terminal 400; and a first receiving module 503, configured to receive a sequence signal that is sent by the terminal 400 by using the channel resource carried in the control information sent by the first sending module 502, where the sequence signal is determined by the terminal 400 based on the sequence identifier.

Figure 8:
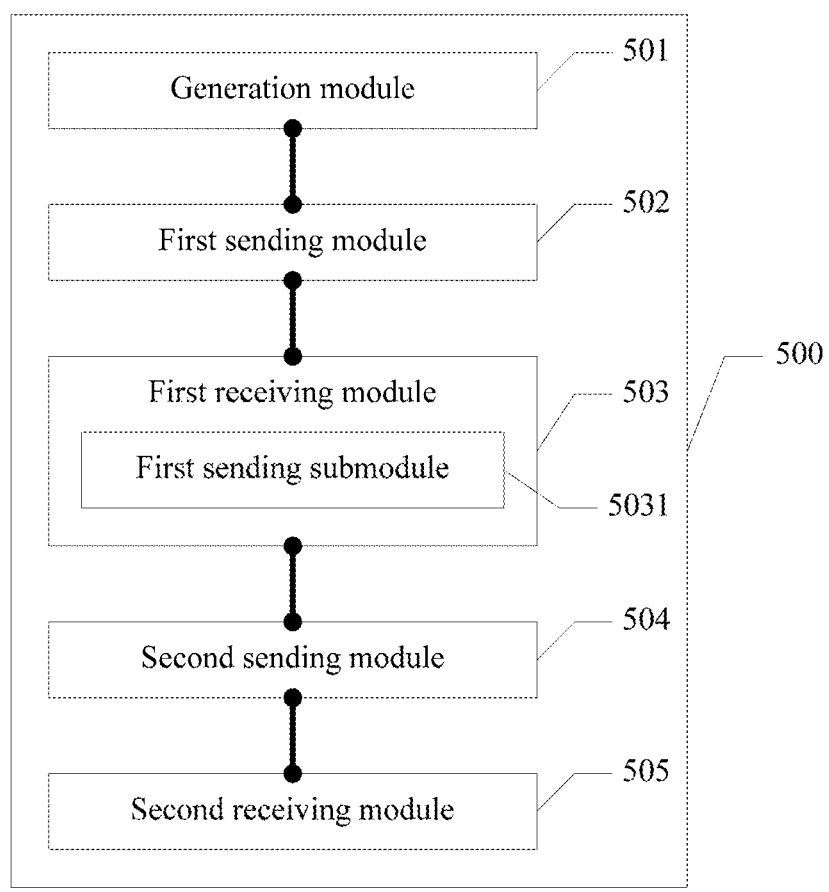
FIG. 8 is a schematic diagram of another embodiment of a network-side device according to embodiments of the present disclosure.

Referring to FIG. 8, specifically, the first sending module 503 includes:

a first sending submodule 5031, configured to send the control information to the terminal 400 on a broadcast channel, where the control information is carried in system information SIB or a broadcast message MIB.

The network-side device 500 further includes:

a second sending module 504, configured to send channel resource change information to the terminal 400, where the channel resource change information indicates an updated channel resource; and a second receiving module 505, configured to receive the sequence signal that is sent by the second sending module 504 of the terminal 400 by using the updated channel resource.

Figure 9:
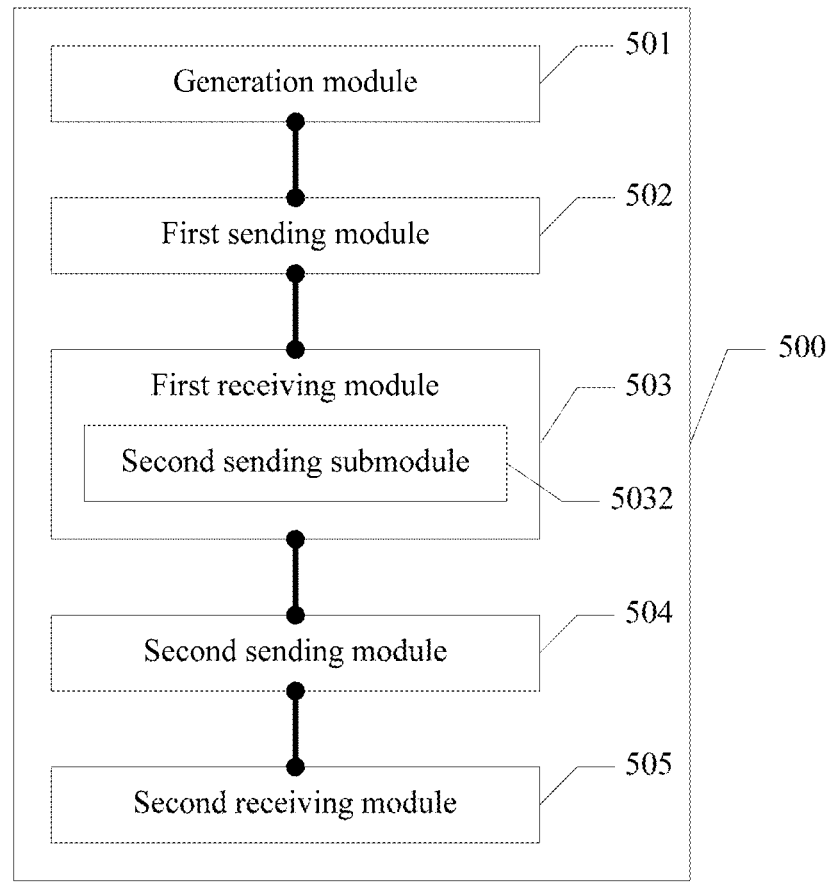
FIG. 9 is a schematic diagram of another embodiment of a network-side device according to embodiments of the present disclosure.

Referring to FIG. 9, the first sending module 503 may further include:

a second sending submodule 5032, configured to send the control information to the terminal 400 on a random access response channel.

The network-side device sends the control information to the terminal, where the control information includes the sequence identifier and the channel resource indication, obtains the sequence signal by using the sequence identifier and the preset correspondence, and obtains the channel resource by using the channel resource indication, so that when the network-side device receives the sequence signal sent by the terminal, the required channel resource is clearly indicated to the terminal, and the method for transferring the channel resource is further clarified. Therefore, it is ensured that the terminal obtains stable and reliable communication quality and provides satisfactory user experience.

Figure 10:
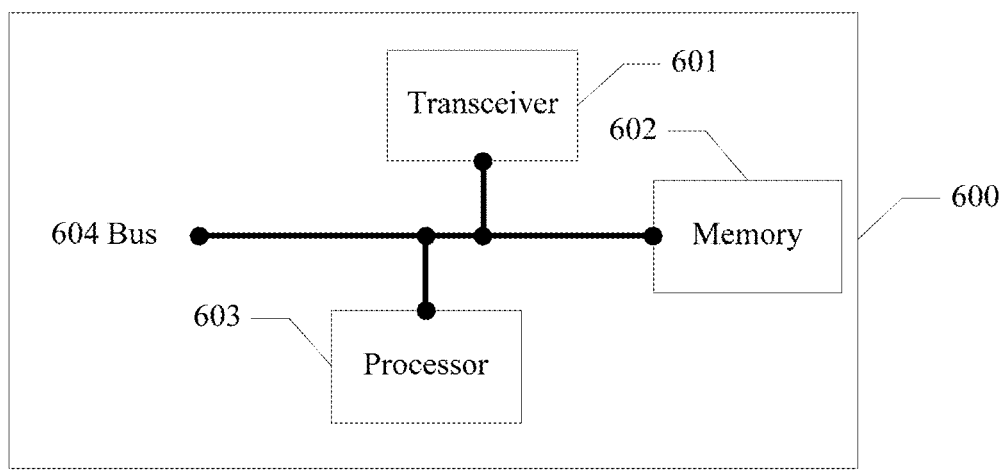
FIG. 10 is a schematic diagram of another embodiment of a terminal according to embodiments of the present disclosure.

The terminal in the embodiments of this application is described above from a perspective of a modularized functional entity, and the terminal in the embodiments of this application is described below from a perspective of hardware processing. Referring to FIG. 10, an embodiment of this application provides a terminal 600. The terminal 600 is configured to receive control information from a network-side device, to clarify a channel resource used by the terminal to send a sequence signal to the network-side device.

The terminal 600 includes a transceiver 601, a memory 602, a processor 603, and a bus 604.

The transceiver 601, the memory 602, and the processor 603 are connected by using the bus 604.

The transceiver 601 is configured to receive control information sent by the network-side device, the control information includes a sequence identifier and a channel resource indication, and the channel resource indication is used to indicate a channel resource available for the terminal.

The transceiver 601 may include a communications interface between the processor 603 and a standard communications subsystem.

The transceiver 601 may further include a communications interface in the EIA-RS-232C standard, that is, a communications interface that is in a serial binary data exchange interface technology standard and that is between data terminal equipment (DTE) and data communications equipment (DCE), and may further include a communications interface in the RS-485 protocol. This is not limited in the present disclosure.

The processor 603 is configured to determine a corresponding sequence signal based on the sequence identifier.

The processor 603 may be a central processing unit (CPU), a network processor (NP), or a combination of the CPU and the NP.

The processor 603 may further include a hardware chip. The foregoing hardware chip may be an application-specific integrated circuit (ASIC), a programmable logic device (PLD), or a combination thereof. The foregoing PLD may be a complex programmable logical device (CPLD), a field programmable gate array (FPGA), a generic array logic (GAL), or any combination thereof.

The transceiver 601 is further configured to send the sequence signal by using the channel resource.

The memory 602 is configured to store a program, the sequence identifier, the sequence signal, a preset correspondence, the control information, and the channel resource indication.

The memory 602 may include a volatile memory, such as a random access memory (RAM). The memory 602 may further include a non-volatile memory, such as a flash memory, a hard disk, or a solid state disk or drive (SSD). The memory may further include a combination of memories of the foregoing types. This is not limited in the present disclosure.

Figure 2:
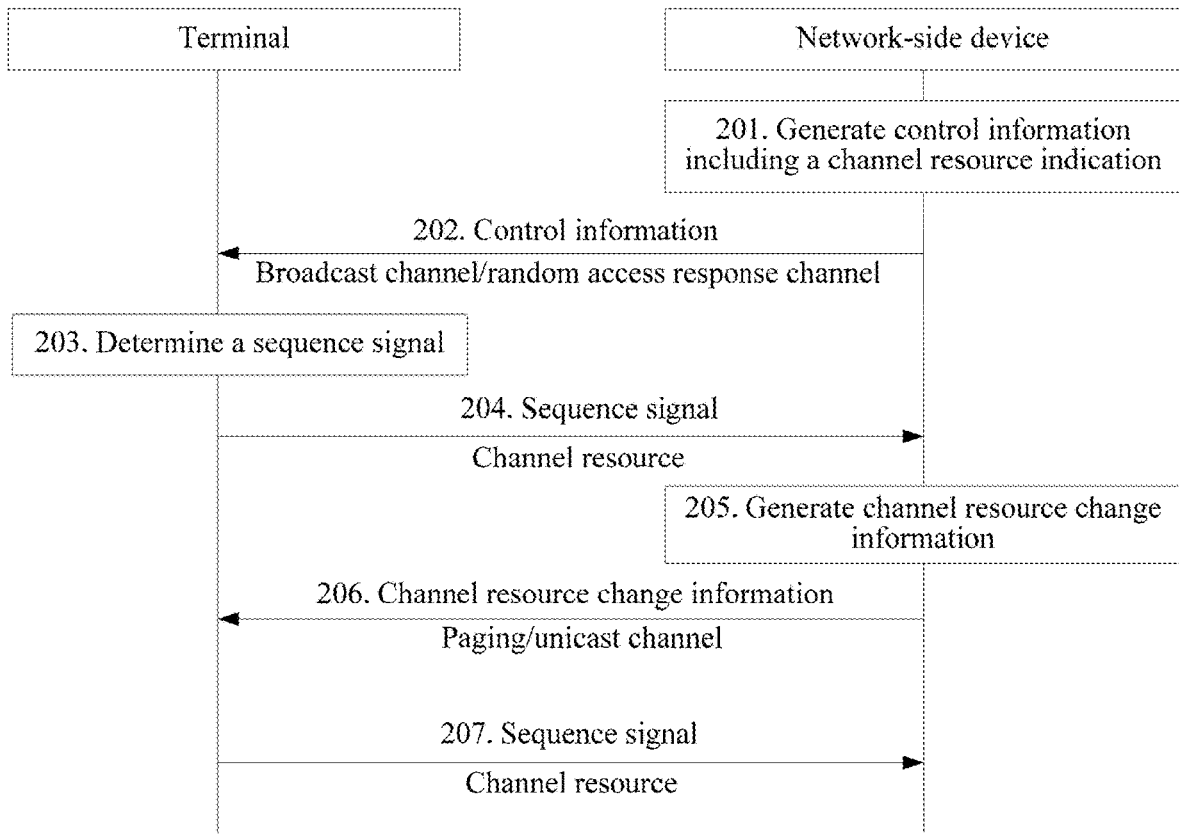
FIG. 2 is a schematic diagram of an embodiment of a sequence signal sending method according to embodiments of the present disclosure.

Optionally, the memory 602 may be further configured to store a program instruction, and the processor 603 may invoke the program instruction stored in the memory 602 to perform one or more steps or the optional implementations in the embodiment shown in FIG. 2, so that the terminal 600 implements a function of the foregoing method.

The terminal receives the control information sent by the network-side device, where the control information includes the sequence identifier and the channel resource indication, obtains the sequence signal by using the sequence identifier and the preset correspondence, and obtains the channel resource by using the channel resource indication, so that when the terminal sends the sequence signal to the network-side device, the required channel resource is clearly indicated to the terminal, and the method for transferring the channel resource is further clarified. Therefore, it is ensured that the terminal obtains stable and reliable communication quality and provides satisfactory user experience.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A sequence signal sending method applied to a user equipment-centric network, the method comprising:

receiving, by a terminal, control information sent by a network-side device, wherein the control information comprises a sequence identifier and a channel resource indication, the channel resource indication for indicating a channel resource available for the terminal;
determining, by the terminal, a corresponding sequence signal based on the sequence identifier; and
sending, by the terminal, the sequence signal by using the channel resource.

2. The method according to claim 1, wherein determining, by the terminal, a corresponding sequence signal based on the sequence identifier comprises:
obtaining, by the terminal, a transmission time interval;
determining, by the terminal based on a preset correspondence, a sequence set corresponding to the transmission time interval, wherein the preset correspondence indicates that the sequence set corresponds to the transmission time interval, and wherein the sequence set comprises one or more sequence signals; and
determining, by the terminal based on a preset binding relationship, the sequence signal corresponding to the sequence identifier in the sequence set, wherein the preset binding relationship indicates that the sequence identifier corresponds to the sequence signal.

3. The method according to claim 1, wherein receiving, by a terminal, control information sent by a network-side device comprises:
receiving, by the terminal on a broadcast channel, the control information sent by the network-side device, wherein the control information is carried in a system information block (SIB) or a broadcast message master information block (MIB).

4. The method according to claim 1, wherein receiving, by a terminal, control information sent by a network-side device comprises:
receiving, by the terminal on a random access response channel, the control information sent by the network-side device.

5. The method according to claim 1, further comprising:
receiving, by the terminal, channel resource change information for indicating an updated channel resource; and
sending, by the terminal, the sequence signal to the network-side device by using the updated channel resource.

6. A sequence signal receiving method applied to a user equipment-centric network, the method comprising:
generating, by a network-side device, control information comprising a channel resource indication and a sequence identifier, the channel resource indication for indicating a channel resource used by a terminal;
sending, by the network-side device, the control information to the terminal; and
receiving, by the network-side device, a sequence signal sent by the terminal by using the channel resource, wherein the sequence signal is determined by the terminal based on the sequence identifier.

7. The method according to claim 6, wherein sending, by the network-side device, the control information to the terminal comprises:
sending, by the network-side device, the control information to the terminal on a broadcast channel, wherein the control information is carried in a system information block (SIB) or a broadcast message master information block (MIB).

8. The method according to claim 6, wherein sending, by the network-side device, the control information to the terminal comprises:
sending, by the network-side device, the control information to the terminal on a random access response channel.

9. The method according to claim 6, further comprising:
sending, by the network-side device, channel resource change information to the terminal, the channel resource change information for indicating an updated channel resource; and
receiving, by the network-side device, the sequence signal sent by the terminal by using the updated channel resource.

10. A terminal for use in a user equipment-centric network, the terminal comprising:
a transceiver configured to receive control information sent by a network-side device, wherein the control information comprises a sequence identifier and a channel resource indication, the channel resource indication for indicating a channel resource available for the terminal;
a processor configured to determine a corresponding sequence signal based on the sequence identifier received by the transceiver; and
wherein the transceiver is configured to send, by using the channel resource, the sequence signal determined by the processor.

11. The terminal according to claim 10, wherein the processor is further configured to:
obtain a transmission time interval;
determine, based on a preset correspondence, a sequence set corresponding to the obtained transmission time interval, wherein the preset correspondence indicates that the sequence set corresponds to the transmission time interval, and the sequence set comprises one or more sequence signals; and
determine, based on a preset binding relationship, the sequence signal corresponding to the received sequence identifier that is in the determined sequence set, wherein the preset binding relationship indicates that the sequence identifier corresponds to the sequence signal.

12. The terminal according to claim 10, wherein the transceiver is configured to:
receive, on a broadcast channel, the control information sent by the network-side device, wherein the control information is carried in a system information block (SIB) or a broadcast message master information block (MIB).

13. The terminal according to claim 10, wherein the transceiver is configured to:
receive, on a random access response channel, the control information sent by the network-side device.

14. The terminal according to claim 10, wherein the transceiver is configured to:
receive channel resource change information, wherein the channel resource change information indicates an updated channel resource; and
send the sequence signal to the network-side device by using the updated channel resource.

15. A network-side device for use in a user equipment-centric network, the network-side device comprising:
a processor configured to generate control information comprising a channel resource indication and a sequence identifier, the channel resource indication for indicating a channel resource used by a terminal; and
a transceiver configured to
send the control information generated by the generation module to the terminal, and receive a sequence signal sent by the terminal by using the channel resource carried in the control information sent by the transceiver, wherein the sequence signal is determined by the terminal based on the sequence identifier.

16. The network-side device according to claim 15, wherein the transceiver is configured to:
send the control information to the terminal on a broadcast channel, wherein the control information is carried in a system information block (SIB) or a broadcast message master information block (MIB).

17. The network-side device according to claim 15, wherein the transceiver is configured to:
send the control information to the terminal on a random access response channel.

18. The network-side device according to claim 15, wherein the transceiver is configured to:
send channel resource change information to the terminal, the channel resource change information for indicating an updated channel resource; and
receive the sequence signal that is sent by the terminal by using the updated channel resource.

* * * * *